US011169052B2

(12) United States Patent
Signor et al.

(10) Patent No.: US 11,169,052 B2
(45) Date of Patent: Nov. 9, 2021

(54) TEST STAND AND METHOD FOR PERFORMING A TEST TO SIMULATE A TEST DRIVE OF A VEHICLE

(71) Applicant: AVL LIST GmbH, Graz (AT)

(72) Inventors: Camillo Signor, Neunkirchen (AT); Emre Kural, Graz (AT); Gerald Hochmann, Hitzendorf (AT); Wolfgang Winkler, Pischeldorf in der Steiermark (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 16/769,230

(22) PCT Filed: Dec. 3, 2018

(86) PCT No.: PCT/EP2018/083301
§ 371 (c)(1),
(2) Date: Jun. 2, 2020

(87) PCT Pub. No.: WO2019/110483
PCT Pub. Date: Jun. 13, 2019

(65) Prior Publication Data
US 2021/0190633 A1 Jun. 24, 2021

(30) Foreign Application Priority Data
Dec. 4, 2017 (AT) .............................. A 51000/2017

(51) Int. Cl.
*G01M 13/025* (2019.01)
*G07C 5/08* (2006.01)

(52) U.S. Cl.
CPC ......... *G01M 13/025* (2013.01); *G07C 5/0816* (2013.01)

(58) Field of Classification Search
CPC .................................................. G01M 13/025
See application file for complete search history.

(56) References Cited

U.S. PATENT DOCUMENTS 7,668,706 B2 * 2/2010 Schoeggl .......... G01M 17/0072
    703/8
7,680,639 B2 * 3/2010 Schoeggl ............ G01M 17/007
    703/8
(Continued)

FOREIGN PATENT DOCUMENTS

DE  102015217538 A1  3/2017
WO     0052363 A1    9/2000

OTHER PUBLICATIONS

"Test Procedure for Fuel Consumption Rate and Exhaust Emissions of Heavy-Duty Hybrid Electric Vehicles Using Hardware-in-the-Loop Simulator System", Nov. 9, 2012 URL:https://www2.unece.org/wiki/download/attachments/4064802/TS+12-2-34+-+281.pdf Chapter 5 Verification Test Procedure for HILS System for Heavy-Duty Hybrid Electric Vehicles.
(Continued)

*Primary Examiner* — Eric S. McCall
(74) *Attorney, Agent, or Firm* — Dykema Gossett PLLC (57) ABSTRACT

Aspects of the present disclosure are directed to estimating a gearbox gear for a test run from available measured values of a test drive. In some embodiments, a chronological sequence of a vehicle speed and an engine speed may be used as measured values, a number of areas with a linear relationship between the vehicle speed and the engine speed being identified by means of a clustering algorithm from data points from related vehicle speeds and engine speeds. The clustering algorithm, in accordance with some specific embodiments, assigns the data points to the number of areas and calculates a cluster center for each area, which is interpreted as a gear. The gear linked to the cluster center of the area is assigned to the data points of an area in order to obtain a chronological sequence of gears, and used as a target value of the test run.

10 Claims, 6 Drawing Sheets

(56) References Cited

U.S. PATENT DOCUMENTS

| | | |
|---|---|---|
| 10,583,792 B2 | 3/2020 | List et al. |
| 2008/0190183 A1* | 8/2008 | Erlach ................. G01M 15/044 73/114.01 |
| 2011/0000291 A1* | 1/2011 | Mayrhofer ............ G01M 15/02 73/116.05 |
| 2011/0040438 A1 | 2/2011 | Kluge et al. |
| 2016/0171133 A1* | 6/2016 | Pfister .................. G01M 15/02 703/8 |
| 2017/0037959 A1* | 2/2017 | Pflueger .............. F16H 61/0213 |
| 2018/0143101 A1* | 5/2018 | Pfister ............... G01M 17/0074 |
| 2018/0335370 A1* | 11/2018 | Maschmeyer ...... G01M 15/042 |
| 2019/0225235 A1* | 7/2019 | Schyr .................. G01M 17/007 |
| 2019/0310162 A1* | 10/2019 | Pfeiffer .............. G01M 13/025 |
| 2019/0318051 A1* | 10/2019 | Oswald ................. G01M 17/00 |
| 2020/0346659 A1* | 11/2020 | Duser ................ G01C 21/3407 |
| 2020/0348209 A1* | 11/2020 | Pfister .................. G01M 15/04 |

OTHER PUBLICATIONS

Na Na, "Gear shift analysis", Sweden Jul. 18, 2011 (Jul. 18, 2011), Abgerufen von: URL:http://www.unece.org/fileadmin/DAM/trans/doc/2011/wp29grpe/WLTP-DHC-09-03e.pdf.

* cited by examiner

TEST STAND AND METHOD FOR PERFORMING A TEST TO SIMULATE A TEST DRIVE OF A VEHICLE

CROSS-REFERENCE TO RELATED APPLICATIONS

This application is a national stage filing based upon International PCT Application No. PCT/EP2018/083301, filed 3 Dec. 2018, which claims the benefit of priority to Austria application No. A 51000/2017, filed 4 Dec. 2017.

BACKGROUND

The present invention relates to a method for performing a test on a test bench, and an associated test bench for simulating a test drive of a vehicle, which is represented in the form of measured values, a test object and a load machine connected to it being provided on the test bench, and the test being specified in the form of a chronological sequence of target values for the test object and the load machine.

In the development of internal combustion engines, drive trains with internal combustion engines and vehicles with internal combustion engines, checking the emission and consumption behavior of the internal combustion engine plays a central role. In all phases of development, the emission and consumption behavior is checked on test benches, such as an engine test bench, drive train test bench or roller test bench. However, the legal framework conditions for this checking are currently changing significantly. Whilst previously mainly standardized driving cycles, such as the New European Driving Cycle (NEDC), were used for this check, checking under real driving conditions is now also required. For the emission behavior, so-called Real Driving Emission (RDE) tests are used, in which no specific driving cycle is specified, but a more or less random driving route is covered, which only has to correspond to certain defined framework conditions.

For the development of internal combustion engines, drive trains or vehicles on the test bench, it is therefore also desirable to carry out the test on the test bench using such real tests.

It is therefore necessary, on the one hand, to record measured values of the test drive, such as GPS data, engine speed, accelerator pedal position, vehicle speed, etc., from real test drives with a vehicle on a real road. On the other hand, a test run representative of the test drive for a test bench must then be created from the recorded measured values, and can then be run through in whole or in part on the test bench, for example in order to record and evaluate the emission or consumption behavior of the internal combustion engine. Examples of this can be found in DE 10 2012 018 359 A1 or WO 2015/166069 A2.

The internal combustion engine is operated on the test bench according to the specifications of the test run, either alone (engine test bench) or in combination with other components (drive train test bench, roller test bench). To carry out the test, the internal combustion engine is connected, directly or indirectly, to a load machine (dynamometer) on the test bench, and the load machine and the internal combustion engine are controlled by a test bench automation unit in accordance with the requirements of the test run. For example, the load machine can be connected to an internal combustion engine directly via a test bench shaft. On a drive train, for example indirectly via a driven wheel hub of a half-axle of the drive train, a load machine usually is connected to a drive train test bench on both sides of the driven wheel hubs. On a roller test bench the load machine drives a roller on which a wheel of the vehicle rolls. This means that the load machine is also connected indirectly (via the roller) to the internal combustion engine on a roller test bench. The speed of the internal combustion engine (or of the drive train) is generally set by means of the load machine by generating a loading torque for the internal combustion engine. An engine torque is generally set with the internal combustion engine. To this end, the engine control unit is usually given a driver request or torque requirement by accelerator pedal positions, which the engine control unit converts into engine control signals (injection quantity, injection timing, EGR setting, ignition timing, etc.). As a test, target values such as the engine speed and engine torque or an equivalent quantity, such as an accelerator pedal position, a drive train speed, etc., are therefore required in order to be able to carry out the test run on the test bench. These target values, actually a time profile (also as a time-discrete profile) of the target values, are generated as measured values from the real test drive. Ideally, required target values are measured directly during the test drive, for example an engine speed. However, other target values for the test run cannot be measured directly or only with great difficulty and must therefore be generated in another way. An example of this is the engine torque or the current gear of a gearbox (especially in the case of a manual gearbox). Such target values can be derived from other measured values, as described for example in WO 2015/166069 A2. The gear or the times of the gear shift are particularly interesting for a realistic test run, since this significantly influences the emission and consumption values.

SUMMARY OF THE INVENTION

It is therefore an object of the present invention to specify a method by which the gear of a gearbox for a test run can be estimated in a simple manner from other available measured values of a test drive.

This object is achieved in that a chronological sequence of vehicle speeds and engine speeds is used as measured values, a number of areas with a linear relationship between the vehicle speed and the engine speed being identified by means of a clustering algorithm from data points from related vehicle speeds and engine speeds, and the clustering algorithm assigns the data points to the number of areas and calculates a cluster center for each area, which is interpreted as a gear in each case, in that the gear linked to the cluster center of the area is assigned to the data points of an area in order to obtain a chronological sequence of gears, and in that the determined chronological sequence of the gears is used as the target value of the test run or to determine another target value of the test run. The use of a clustering algorithm enables the present measured values to be processed automatically in order to identify areas with a linear relationship between the vehicle speed and the engine speed, which are interpreted as driving phases with a specific gear. By identifying these linear areas, each area can be assigned a gear, which results in a chronological sequence of gears that can be used as gear information for the test run.

Preferably, in the chronological sequence of gears between two adjacent gears, a gear shift time is assumed and the chronological sequence of the gear shift times is used as the target value of the test run or to determine another target value of the test run.

In a simple embodiment, at least one gear shift time can be used as the clutch shift time for the gear change; the at least one clutch shift time can be used as the target value of the test run or to determine another target value of the test run.

The result of the clustering algorithm can be improved if the data points are subjected to a statistical frequency analysis before the clustering algorithm is used in order to identify outlier data points. The outlier data points for the clustering algorithm can be eliminated from the chronological sequence of data points. For this purpose, by specifying a range of variation in the frequency distribution, it can easily be determined whether a data point is regarded as an outlier data point or whether a fluctuation of the data points by the expected linear relationships between vehicle speed and engine speed represent measurement noise.

In an advantageous embodiment, the time of the occurrence of a first outlier data point after an area with a linear relationship between the vehicle speed and the engine speed can be used as the start of a settling phase and the end of the settling phase can be determined after a predetermined time after the beginning of the settling phase, a stable driving phase being defined between the end of the settling phase and the start of the next settling phase and only data points that are assigned to a stable driving phase being used for the clustering algorithm. This also makes it possible to improve the result of the clustering algorithm.

In an advantageous embodiment, the time of the occurrence of a first outlier data point after an area with a linear relationship between the vehicle speed and the engine speed can be used as the start of a settling phase and this time can be used as the gear shift time and/or clutch shift time for the gear change for the test run.

Further data errors can be corrected if a time profile of an accelerator pedal position is used as a further measured value and at least one time range in which the accelerator pedal is not actuated is sought in this time profile, in which time sequence successive gear shift times are sought and the gear assigned to the later gear shift time in the chronological sequence of the gears is used as the gear at the earlier gear shift time. This enables unrealistic gear changes to be recognized and corrected, which improves the test run and makes it more realistic.

BRIEF DESCRIPTION OF THE DRAWINGS

In the following, the present invention is described in greater detail with reference to FIGS. 1 to 9 which, by way of example, show schematic and non-limiting advantageous embodiments of the invention. In the figures.

DETAILED DESCRIPTION

Figure 1:
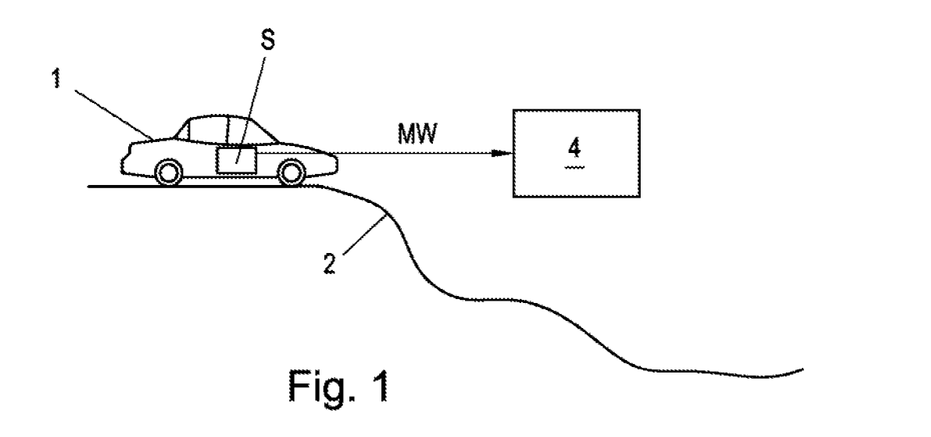
FIG. 1 shows a test drive with a vehicle along a driving route for recording measured values.

The usual starting point for the invention is a test drive with a vehicle 1 along a predetermined driving route 2 (FIG. 1). Here, a real vehicle 1 is moved by a driver on a real road (also a route on a closed test site).

Measured values MW are recorded during the test drive. This can be done via corresponding sensors S, in particular sensors that are present in a vehicle 1 anyway. The measured values MW of such vehicle sensors S can be read out directly, for example, via the on-board diagnostic (OBD) interface. Of course, the vehicle 1 can also be equipped with non-standard vehicle sensors for the test drive in order to record further measured values MW, for example emission values (NOx, HC (CO, $CO_2$, etc.)).

However, it is of course also conceivable that measured values MW of test runs that have already been carried out or measured values MW otherwise obtained (for example from a simulation of a test drive) that represent a test drive are stored in a database, and such measured values MW that have already been stored are processed for the invention.

The measured values MW thus represent the test drive with the vehicle 1 along a driving route 2.

However, the invention is based on the fact that the gear Gn of the gearbox of the vehicle 1 is not directly accessible as a measured value MW during the test drive or simply was not measured or recorded during the test drive and is therefore not available as a measured value MW. However, the chronological shift profile is required to carry out a test run on a test bench 10 for a test object with an internal combustion engine 11, for example a vehicle or a vehicle component (internal combustion engine, drive train), on the basis of the test drive.

If a drive train with a gearbox is set up as a test object on the test bench 10, the shift times and the selected gears are required for controlling the gearbox. The same applies in the case of a vehicle as a test object on a roller test bench. In both cases, the gearbox control unit can be given the shift time and the selected gear directly, or the gearbox control unit on the test bench 10 itself can be replaced by a simulation. This is particularly useful for an automatic gearbox. Alternatively, a shift robot that operates the gearbox can also be provided on the test bench 10. This is particularly useful in the case of a manual gearbox.

If only the internal combustion engine 11 is set up on the test bench 10 as the test object, the test run is often simulated. A virtual vehicle is moved by a virtual driver along a virtual driving route. The movement of the vehicle through the virtual environment is simulated in a simulation unit 5 by means of corresponding simulation models. Of course, the gear shift times GSi and the selected gears Gn are also required for the simulation. This is shown schematically in FIG. 2. The simulated driving route 2 corresponds to the driving route of the test drive and is, for example, described in the form of GPS data, ascent, descent, gradient, curve radii, intersections, traffic signs, etc. The target values SW for performing the test run on a test bench 10 are generated by the simulation. For the simulation of the movement of the vehicle 1, the gear shift times and the selected gear are required.

Figure 2:
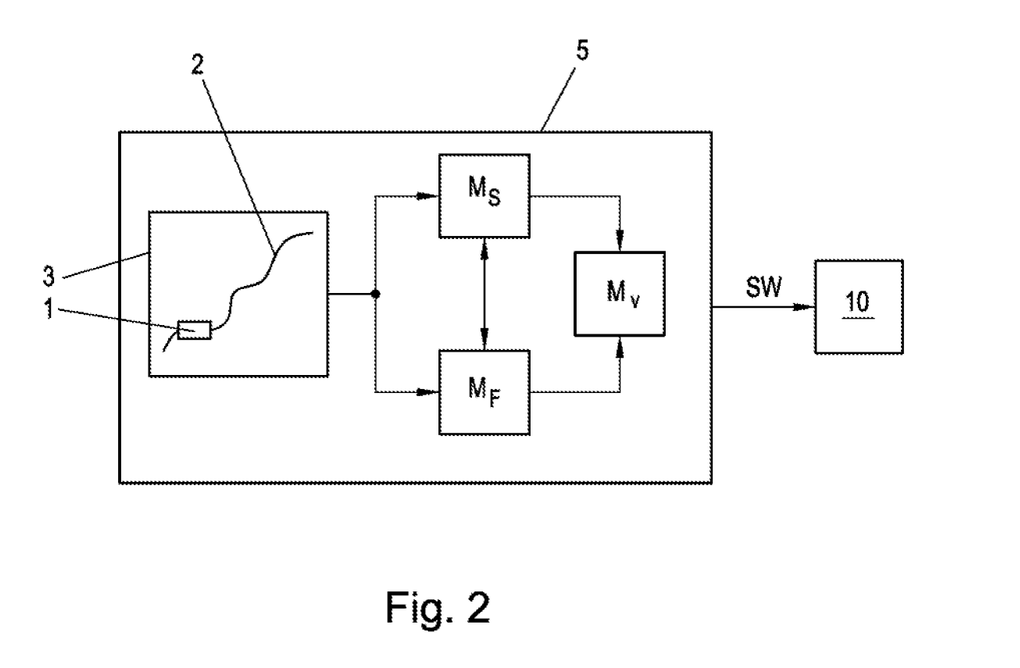
FIG. 2 shows the simulation of a test drive with a virtual vehicle along a virtual driving route for generating the target values for the test run.

To simulate the test drive, the road conditions (altitude, ascent, curve radius, road surface, etc.) are represented by a road model Ms. A driver model ME represents the properties of a driver (shift behavior, driving behavior, etc.) and a vehicle model My represents the dynamics of the vehicle. Of course, further or different simulation models can also be implemented and integrated into the simulation, such as a tire model. Events such as traffic signs, traffic lights, other road users, road traffic, etc. can also be taken into account in such simulations. The necessary simulation models M and simulation units 5 are known and available, which is why there is no need to describe them here.

It can thus be seen that the information about gear shift times GSi and the gears Gn selected here are important information for realistically carrying out a test with a test object on a test bench 10. In addition, clutch shift times that do not necessarily have to correspond exactly to gear shift times GSi can also be interesting.

Figure 3:
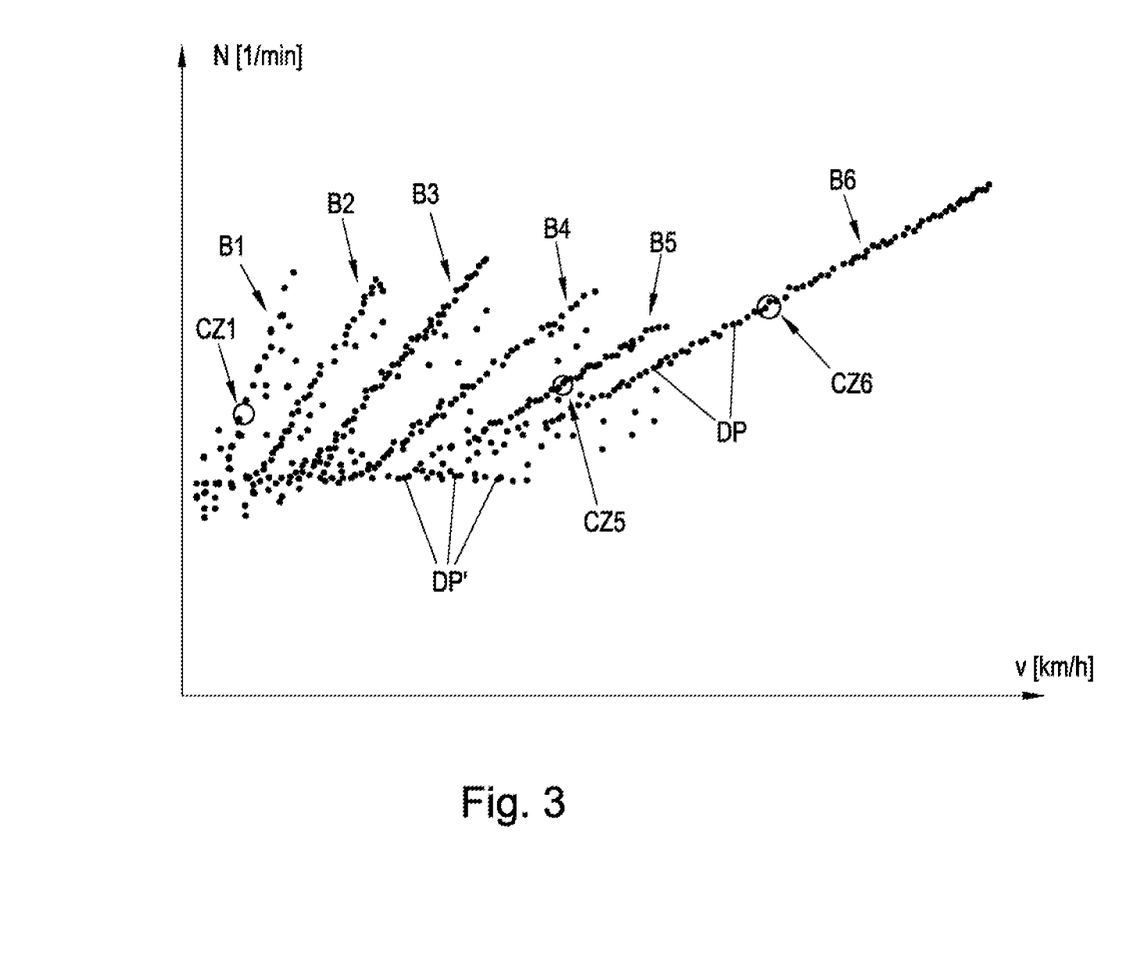
FIG. 3 shows a representation of the linear areas in the data points from vehicle speed and engine speed.
Figure 4:
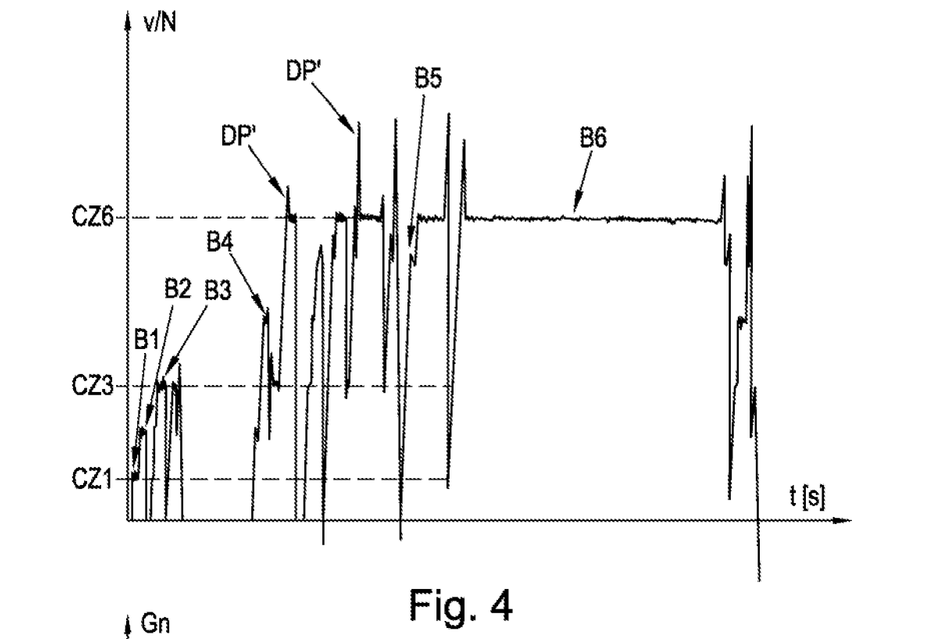
FIG. 4 shows a representation of the linear areas in the ratios of the data points from vehicle speed and engine speed.

With a selected gear Gn and an engaged clutch, a linear relationship between the vehicle speed v (for example in m/s) and the engine speed N (for example in $\min^{-1}$) can be assumed. For the purposes of the invention, engine speed N is also understood to mean an equivalent speed of a drive train which is driven by internal combustion engine 11. For the entire test drive, the measured values MW for the vehicle speed v and the engine speed N could now be plotted in a map (one data point DP for each corresponding vehicle speed v/engine speed N pair), resulting in a number (corresponding to the number of gears selected during the test drive) of linear areas Bn, as shown in FIG. 3. Of course, this also means that at least the vehicle speed v and the engine speed N must be available as measured values MW. Each data point DP in FIG. 3 can, of course, be assigned a time on a time axis (or equivalent path on a path axis) from the time profile of the test drive. Likewise, the ratio v/N between vehicle speed v and engine speed N can be used to determine the gear changes. In FIG. 4 the ratio v/N is plotted over the time t of the test drive (or equivalently also over the distance). Of course, each ratio v/N corresponds to a data point DP. In this case, times with N=0 (which corresponds to engine standstill) are preferably eliminated for gear detection. Such times are not interesting anyway in a comprehensible manner for gear detection for the test run. Times with v=0 (i.e. times when the vehicle is stationary, e.g. waiting in front of a red traffic light) are, of course, interesting for gear detection.

In both representations the expected linear relationship between vehicle speed v and engine speed N in a certain gear Gn can be seen. In FIG. 3 in the form of radiating areas Bn, n≥1 and in FIG. 4 in the form of constant areas Bn, of the ratio v/N. The number n corresponds to the number of gears Gn that were used during the test drive, usually all available gears of the vehicle 1.

Figure 5:
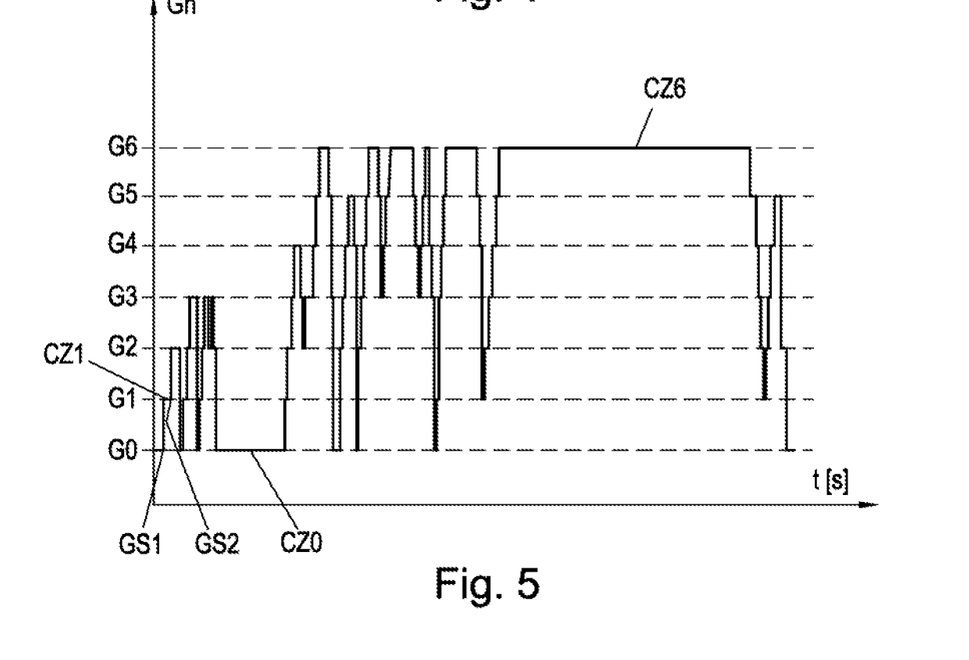
FIG. 5 shows a chronological sequence of the gears for the performance of the test.

A person could, of course, interpret these diagrams accordingly and assign the gears Gn and gear shift times GSi. Of course, the method should run automatically and only receives a chronological sequence of measured vehicle speeds v and engine speeds N (data points DP) from the test drive. According to the invention, a clustering algorithm is applied to the data points DP and is able to assign a large number of data points DP to so-called clusters. The number m of clusters thus corresponds at least to the number n of gears Gn that occur in the test drive. Often at least one further cluster is used, in which data points DP that cannot be assigned are collected. A known clustering algorithm is, for example, the k-means algorithm, which is known in various forms. A clustering algorithm determines a cluster center CZn for each cluster (here the areas Bn) and each data point DP is assigned to a cluster center CZn, and thus to a specific cluster. Simply put, a cluster center CZn is a point within a cluster whose distance (according to a defined distance measure, for example the Euclidean distance) from all data points DP of the cluster is minimal. A clustering algorithm is therefore typically an iterative optimization process. The determined cluster centers CZn are interpreted as gears Gn and each data point DP assigned to the cluster center is assigned to this gear Gn. It is thus possible, for each data point DP, to determine the gear Gn in which the vehicle 1 has been positioned in this data point DP. A time axis (or equivalent path axis) with the different gears Gn and intermediate gear changes, i.e. the gear shift times GSi, can thus be created for the data points DP, as shown in FIG. 5.

It is also known that the quality of the result of the clustering algorithm can be checked using a defined quality measure. Examples of this are the Dunn index or the Davies-Bouldin index as quality measures. The clustering algorithm can be carried out several times in succession for the data and the clustering that achieves the best quality measure is used.

For example, the areas Bn of the ratios v/N are clustered using the clustering algorithm. Each data point DP is thus assigned to a cluster center CZn, which will lie in the area of the constant areas BN of the ratios v/N. The result is shown in FIG. 5. The assigned cluster center CZn, which is interpreted as a gear Gn, is plotted for each data point DP, and the time ranges in which certain gears Gn are engaged and in between which the gear shift times GSi result are evident. This information can be used directly as gear information for the test run.

The clustering algorithm can be supported if the clustering algorithm is informed of the number n of gears Gn, and thus the minimum number of clusters to be expected. Since the vehicle on the test drive is known, this would be possible in most cases. However, a clustering algorithm is basically also able to determine the number of clusters itself.

Due to situations during the measured test drive, such as clutch disengaged, freewheeling phases (no gear engaged), gear change, etc., but also due to measurement errors, there will be data points DP' which lie next to the linear relationship to be expected, as indicated in FIGS. 3 and 4. For example, it is typical that the vehicle speed v and/or the engine speed N can deviate significantly from the expected linear relationship during the gear change.

In particular, it can be seen from FIG. 4, for example, that there are sections of the ratio v/N, i.e. v/N~konst., which are approximately constant areas Bn, and measurement noise is also perceptible by small fluctuations in these areas Bn. However, significant outliers, that is to say data points DP', can also be seen, which clearly differ from the linear areas Bn and which occur in the area of the gear shift times GSi. Such data points DP' are not due to measurement errors, but are attributed to effects when changing gears, particularly when the clutch is actuated.

The method according to the invention can now be improved, on the one hand, by identifying these outlier data points DP' before clustering and by eliminating these data points DP', that is to say, not clustering them. On the other hand, these identified data points DP', or the assigned time on the time axis, can be used to determine the gear shift time GSi and/or clutch times KSi. Alternatively, the clutch times KSi could, of course, also be determined in a defined relationship to the gear shift time GSi, for example a predetermined time before and after the gear shift time GSi.

Figure 6:
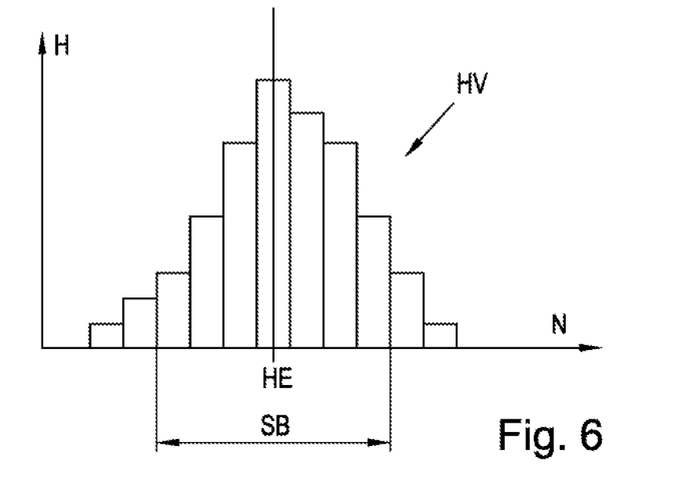
FIG. 6 shows a frequency distribution for the identification of outlier data points.

The outlier data points DP' can be found, for example, using a known statistical frequency analysis. This is explained using the example of FIG. 4 with the ratios v/N. The frequencies H of the occurrence of the individual data points DP, here the ratios v/N, are determined, which leads to statistical frequency distributions HV, as shown for example in FIG. 6. This will result in the number of frequency distributions HV corresponding to the number n of gears Gn. Certain areas of the data are often grouped into frequency groups Hx. The frequency distribution HV thus results as the range of variation of the frequencies H around an expected value HE (the greatest frequency H). An allowable range of variation SB around the expected value HE is determined or specified. The data points DP' are then regarded as outliers, the associated frequency of which lies outside the range of variation SB. In the statistics, the quartile range $Q_{75}$-$Q_{25}$ is often used, i.e. the range that covers 50% of the frequency distribution. The range of variation SB can then be defined, for example, as x times the quartile range, for example 1.5 times the quartile range.

Outlier data points DP' can of course also be identified in other ways. For example, it could be checked by how much a data point DP changes compared to the previous one, or to an average of a number of previous data points DP. If the change exceeds a predetermined threshold value, a data point DP could be identified as an outlier.

The striking outlier data points DP' can thus be identified in a simple manner.

The first occurrence of an outlier data point DP' after a phase with v/N~konst. can be used as the gear shift time GSi. A clutch shift time KSi (clutch disengaged) can also be related to the gear shift time GSi, for example at the same time or a predetermined time before it. The following clutch shift time KSi (clutch engaged) can be set a specified time after disengagement of the clutch. The times for clutch disengaged and/or clutch engaged could also be made dependent on a driver type for the test.

The result of the determination of the gears Gn and the gear shift times GSi, and possibly the clutch shift time KSi, can be further improved if measurement values MW for the accelerator pedal position α of the vehicle 1 are also taken into account. This step assumes that the accelerator pedal is not operated or released during the gear change. Consequently, time ranges ZN in which the accelerator pedal is not actuated, for example the accelerator pedal position α=0 (or by presetting a window around zero is approximately zero) are sought in the time profile of the accelerator pedal position α. If there are ZN gear shift times GSi in such a time range, then the gears Gn are examined at the gear shift times GSi, as will be explained with reference to FIG. 7. It can be assumed that only one gear change, either up or down, takes place during a time range ZN. Thus, only one gear shift time GSi should be found in a time range ZN. However, if there are successive gear shift times GSi, GSi+1 (at the top in FIG. 7) at a time ZN, it can be assumed that it is a data error. This can be corrected by considering the gear Gn at the later gear shift time GSi+1 as the correct gear Gn and correcting the gear Gn at the earlier gear shift point GSi to the gear Gn at the gear shift point GSi+1 (at the bottom in FIG. 7).

A possible concrete implementation of the method according to the invention for gear recognition from measured values MW of the vehicle speed v, the engine speed N and the accelerator pedal position α could take place as follows using the example of the ratios v/N.

Figure 8:
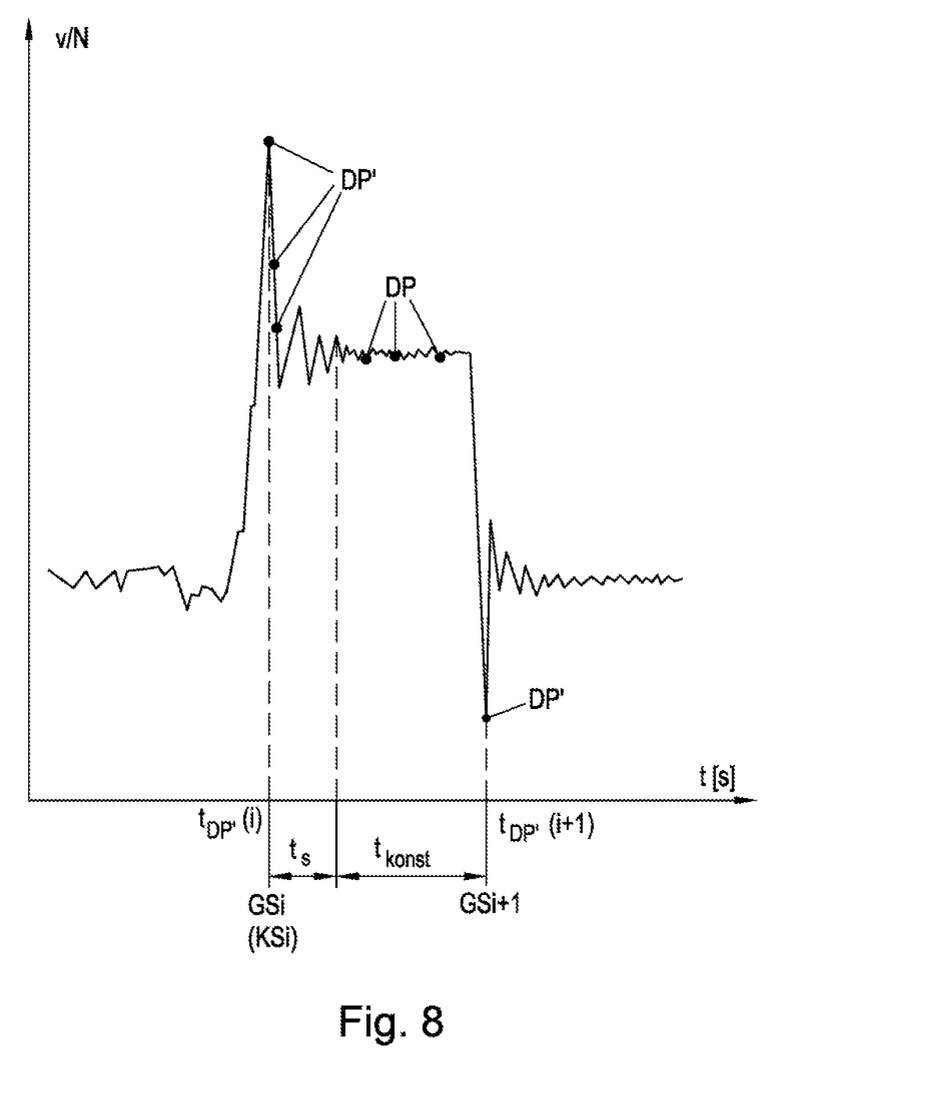
FIG. 8 shows the division of the time axis of the test run into settling phases and stable driving phases and FIG. 9 shows a test bench for performing the test.

First, the ratios v/N(j) are determined for all j existing data points DPj of the test drive, that is, v/N(j)=v($t_j$)/N($t_j$) with the discrete times $t_j$ on the time axis t. For this step, the data points DPj with N($t_j$)=0 have preferably already been eliminated. The temporal sequence of the data points DPj determined in this way is approximated by a predetermined function F which can be differentiated according to the time t, for example a spline interpolation, for example by cubic splines. The next step is to determine the local maxima $Fmax_k$ of the function F. For this purpose, the function F can be derived, for example, according to the time t and a local maximum can be defined as a point at which the difference between the differences in the derivation of the point and the respective neighboring points has an opposite sign, for example $$\left| \text{sgn}\left[\frac{d}{dt}F(j) - \frac{d}{dt}F(j-1)\right] - \text{sgn}\left[\frac{d}{dt}F(j+1) - \frac{d}{dt}F(j)\right] \right| = 2$$

with the sign function sgn. Local maxima could, of course, also be identified in another way, for example via the second time derivative of the function F. The k local maximum values $Fmax_k$ determined in this way are then preferably subjected to a statistical frequency analysis in order to identify outlier data points DP'. Outlier data points DP' are attributed to shifting operations, as explained above. The outlier data points DP' are now examined in more detail, as will be explained with reference to FIG. 8.

As already stated, a gear change is characterized in that the ratio v/N fluctuates significantly at first, which leads to outlier data points DP', and then a time period follows during which the ratio v/N is approximately constant. The first occurrence time $t_{DP}(i)$ of an outlier data point DP' is now sought, which follows a period of a constant ratio v/N. This first occurrence time $t_{DP}(i)$ is interpreted as the start of a gear change, that is to say as the gear shift time GSi. At the same time, this time can also be understood as the clutch shift time KSi (i.e. clutch disengaged). However, the clutch shift time KSi can also be set a predetermined time before the gear shift time GSi. The first occurrence time $t_{DP\alpha}(i)$ of an outlier data point DP' is followed by a time period in which the data points settle on the linear region Bn, that is to say, for example, on v/N~konst. A settling time $t_S$ is determined, for example 3s, and the data points DP that lie between the first occurrence time $t_{DP}(i)$ of the outlier data point DP' and the following settling time $t_S$ are assigned to a settling phase that follows a gear change. The following data points DP, until the next occurrence $t_{DP}(i+1)$ of an outlier data point DP', are assigned to a stable driving phase $t_{konst}$ with gear Gn engaged. This is carried out for the entire time axis t of the test drive. The time axis t of the test drive is thus divided into phases of the gear change (first occurrence of an outlier data point DP'+settling phase $t_S$) and in stable driving phases $t_{konst}$ lying between them. All data points DP that are assigned to the stable driving phases $t_{konst}$ are now transferred to the clustering algorithm in order to calculate the cluster centers CZn, and thus the gears Gn. All other data points DP could be set to zero for clustering and also transferred to the clustering algorithm, which would thus determine n+1 clusters. As explained above, the clustering can also be carried out several times and the best result can be selected using a defined quality measure.

The center of the data points DP in a settling phase $t_S$ could also be determined and the associated time could be used as the gear shift time GSi. The associated first occurrence of an outlier data point DP' could be used as the clutch time KSi.

The end of the settling phase $t_S$ could be used as the time for the clutch to be engaged, or a fixed period of time after the clutch was disengaged. This time period could also be made dependent on a driver type.

Figure 7:
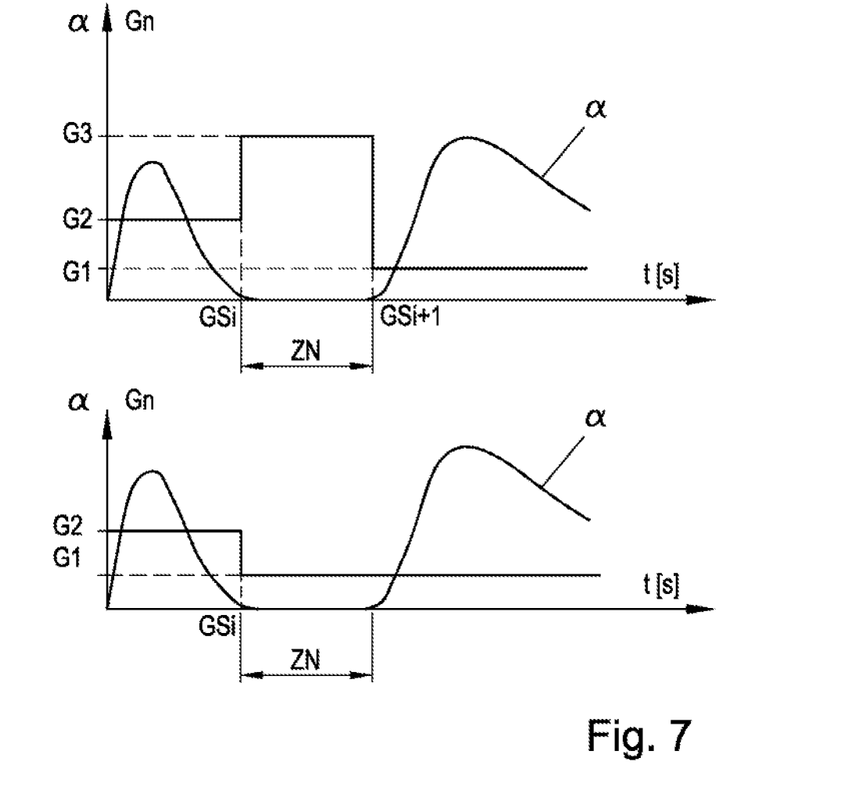
FIG. 7 shows a correction of the chronological sequence of the gears based on the accelerator pedal position.

Subsequently, the gear correction can be carried out, as described with reference to FIG. 7, on the result of the clustering with the accelerator pedal position α.

Although the invention was explained above primarily with reference to FIG. 4 on the basis of the ratios v/N, the invention can, however, be used in the same way starting from a relationship according to FIG. 3.

On a test bench 10 (FIG. 9), here an engine test bench, for example, an internal combustion engine 11 is connected as a test object to a load machine 12, for example via a test bench shaft 14. A test bench automation unit 13 controls both the internal combustion engine 11 and the load machine 12 in accordance with the requirements of the test in the form of specific target values SW fora variable to be controlled. Typically, the load machine 12 is used to control a time profile of a rotational speed N specified in accordance with the test, and the internal combustion engine 11 is used to control a time profile of a torque T specified in accordance with the test. From the predetermined target values SW, the test bench automation unit 13 determines the manipulated variables ST with which the internal combustion engine 11 and the load machine 12 are controlled. In the case of the load machine 12, the manipulated variable $ST_B$ is, for example, a speed by which the engine speed N of the internal combustion engine 11 is set. For this purpose, a corresponding speed controller $R_N$ can also be implemented in the test bench automation unit 13, which can also receive an actual value of the speed $N_{ist}$, which is detected, for example, by means of a speed sensor 15 on the load machine 12. The internal combustion engine 11 is controlled using a suitable manipulated variable $ST_V$, for example an accelerator pedal position α or an engine torque T, which is transferred to an engine control unit ECU. In the test bench automation unit 13 for this purpose, a torque controller $R_T$ can be implemented which, from an actual value of the torque $T_{ist}$ which, for example, can be measured by a torque sensor 16 on the test bench shaft 14 or can also be estimated from other measured quantities (observer), and the predetermined target value SW, determines an accelerator pedal position α, which is transferred to the engine control unit ECU for controlling the internal combustion engine 11. Of course, other versions of a test bench 10 are also conceivable.

Figure 9:
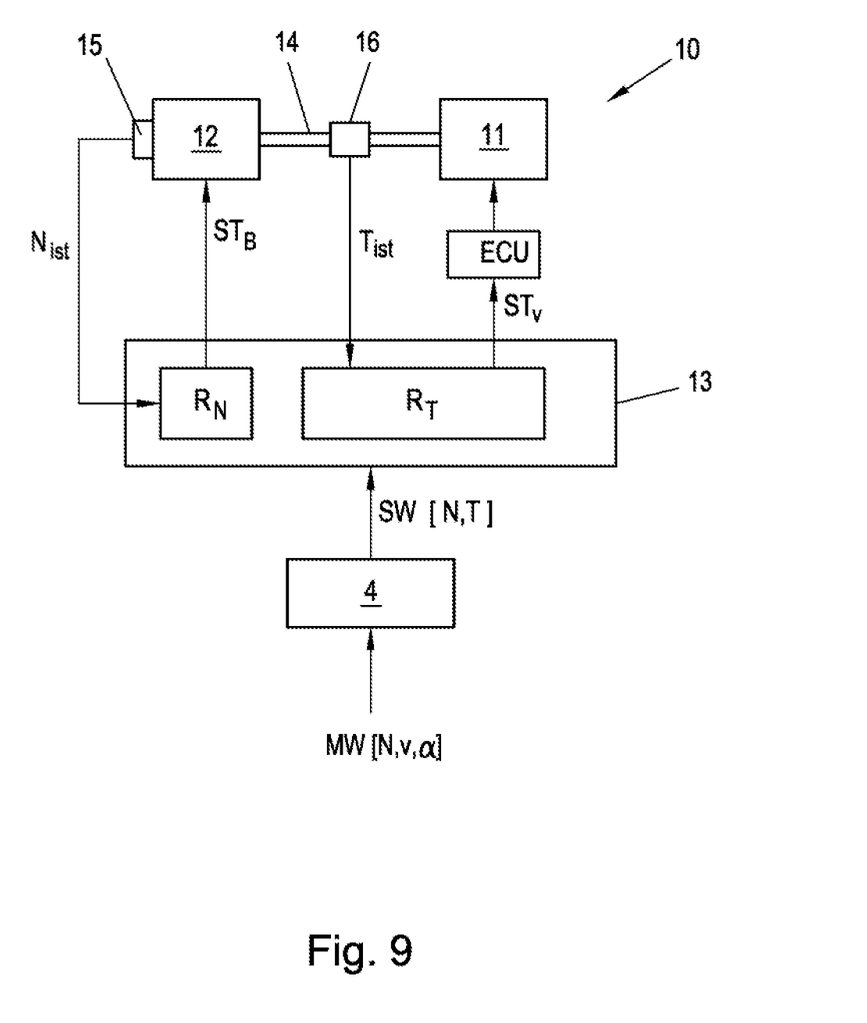

The target values SW, for example engine speed N and torque T, are generated from measured values MW in an evaluation unit 4. In this case, an unavailable measured value can also be derived from other measured values MW.

An example of this is the torque T of the internal combustion engine 11, which often cannot be measured during a real test drive. The torque can then be taken, for example, from known maps (for example a map for speed, accelerator pedal position, torque) or can also be calculated from models or physical relationships. The torque could be calculated from a road gradient, the vehicle mass and a resistance factor (rolling resistance, air resistance) and the vehicle dynamics (speed, acceleration). The engine power could be determined from the vehicle speed and a vehicle resistance force (from the gradient of the road, rolling resistance, air resistance, etc.), from which the torque can then be calculated with the speed. It is obvious that there is a wealth of options here for determining quantities that are not directly measured.

The gear information, as a chronological sequence of the gears Gn and the intermediate gear shift times GSi, and possibly also the clutch shift times KSi, can be determined in the evaluation unit 4, as explained above. This gear information can be used in the evaluation unit 4 in order to determine the target values SW for the test run, for example by simulating a journey with a virtual vehicle as explained above. However, the gear information can also be transferred to the test bench automation unit 13 as target values SW in order to control the test object on the test bench 10. For example, a drive train with an internal combustion engine 11 and gearbox can be set up as the test object, the test bench automation unit 13 actuating the gearbox, and possibly also the clutch, with the gear information during the test run.

The evaluation unit 4 could also be implemented in the test bench automation unit 13 as hardware and/or software.

The invention claimed is:

1. A method for carrying out a test on a test bench for simulating a test drive of a vehicle, the test drive being represented by measured values, the method including the following steps:
   providing a test object and a load machine connected to the test object, both the test object and the load maching being provided on the test bench;
   specifying a test run in the form of a chronological sequence of target values for the test object and the load machine, characterized in that a chronological sequence of a vehicle speed and an engine speed are used as measured values;
   identifying a number of areas with a linear relationship between the vehicle speed and the engine speed by means of a clustering algorithm from data points from related vehicle speeds and engine speeds;
   assigning, via the clustering algorithm, the data points to the number of areas;
   calculating a cluster center for each of the number of areas,
   interpretating the cluster center as a gear in each of the number of areas;
   assigning the gear linked to the cluster center of the area to the data points of an area in order to obtain a chronological sequence of gears; and
   using the determined chronological sequence of the gears as a target value of the test run or to determine another target value of the test run.

2. The method according to claim 1, characterized in that in the chronological sequence of gears there is a gear shift time between two adjacent gears, and the chronological sequence of the gear shift times is used as the target value of the test run or to determine another target value of the test run.

3. The method according to claim 2, characterized in that at least one gear shift time is used as a clutch shift time for the gear change and in that the clutch shift time is used as the target value of the test run or to determine the another target value of the test run.

4. The method according to claim 1, characterized in that before application of the clustering algorithm the data points are subjected to a statistical frequency analysis in order to identify outlier data points.

5. The method according to claim 4, characterized in that the outlier data points for the clustering algorithm are eliminated from the data points.

6. The method according to claim 4, characterized in that a time of the occurrence of a first outlier data point after an area with a linear relationship between the vehicle speed and the engine speed is used as the start of a settling phase, and the end of the settling phase is determined after a predetermined time after the start of the settling phase, in that a stable driving phase is determined between the end of the settling phase ($t_s$) and the start of a next settling phase and in that only data points that are assigned to the stable driving phase are input to the clustering algorithm.

7. The method according to claim 6, characterized in that the data points which are assigned to the settling phase are set to zero and are inputs to the clustering algorithm.

8. The method according to claim 4, characterized in that a time of the occurrence of a first outlier data point after an area with a linear relationship between the vehicle speed and the engine speed is used as the beginning of a settling phase, and the time is used as the gear shift time and/or clutch shift time for the gear change.

9. The method according to claim 1, characterized in that a time profile of an accelerator pedal position is used as a further measured value, and at least one time range in which the accelerator pedal is not actuated is sought in this time profile, in that in this at least one time range chronologically successive gear shift times are sought and in that the gear assigned to the later gear shift time in the chronological sequence of gears is used as the gear at the earlier gear shift time.

10. A test bench for carrying out a test to simulate a test drive of a vehicle, which is specified in the form of measured values (MW), the test bench comprising:

a test object;
a load machine connected to the test object;
a test bench automation unit configured and arranged to control both the test object and the load machine by specifying target values of a test run for the test object and the load machine;
an evaluation unit configured and arranged to
use a chronological sequence of a vehicle speed and an engine speed as measured values,
identify a number of areas with a linear relationship between the vehicle speed and the engine speed by means of a clustering algorithm from data points from related vehicle speeds and engine speeds,
calculate a cluster center for each of the areas, which is interpreted as a gear,
assign each data point to an area and the gear linked to the area in order to obtain a chronological sequence of gears, and
transfer the determined chronological sequence of the gears as target value of the test run or to determine another target value of the test run to the test bench automation unit.

* * * * *